(No Model.)

W. H. PICKETT.
PIPE THREAD PROTECTOR.

No. 562,339. Patented June 16, 1896.

WITNESSES:
F. E. Gaither
W. H. Erskine

INVENTOR,
William H. Pickett
by Daniel S. Wolcott Att'y.

UNITED STATES PATENT OFFICE.

WILLIAM H. PICKETT, OF WARREN, PENNSYLVANIA, ASSIGNOR TO THE BLAKEY MANUFACTURING COMPANY, OF PITTSBURG, PENNSYLVANIA.

PIPE-THREAD PROTECTOR.

SPECIFICATION forming part of Letters Patent No. 562,339, dated June 16, 1896.

Application filed December 13, 1895. Serial No. 571,993. (No model.)

*To all whom it may concern:*

Be it known that I, WILLIAM H. PICKETT, a citizen of the United States, residing at Warren, in the county of Warren and State of Pennsylvania, have invented or discovered a certain new and useful Improvement in Pipe-Thread Protectors, of which improvement the following is a specification.

The invention described herein relates to certain improvements in protectors for the threaded ends of pipes, &c., and has for its object the construction of a thin metal sleeve having an internal diameter approximately equal to the external diameter of the pipe to which it is to be applied and provided with one or more internal projections adapted to engage the threads of the pipe and formed by bending in a portion of the metal of the sleeve.

The invention is hereinafter more fully described and claimed.

Figure 1:
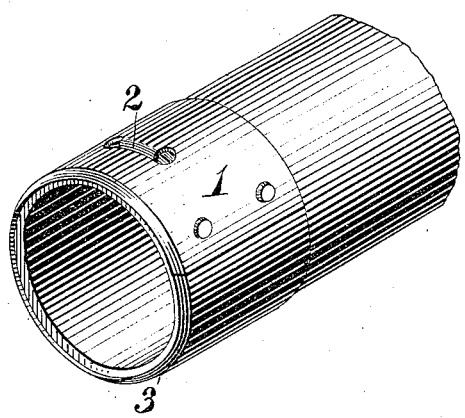
Figure 2:
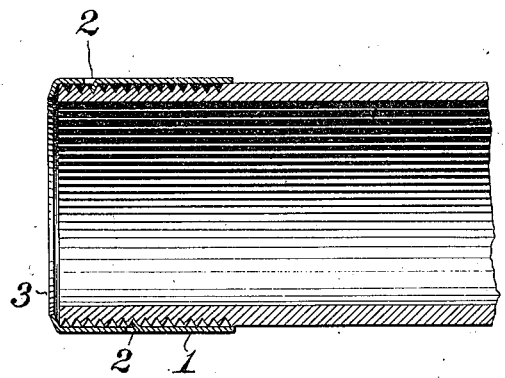

In the accompanying drawings, forming a part of this specification, Figure 1 is a perspective view of a protector constructed in accordance with my invention applied to the threaded end of a pipe, and Fig. 2 is a sectional elevation of the same.

In the practice of my invention the sleeve 1 is formed of a strip of sheet metal of such a gage or thickness that when bent and secured in annular shape the resulting sleeve will have a considerable degree of stiffness or rigidity. The strip, if made of a width greater than the length of the threaded portion of the pipe, so that the sleeve which is formed by bending the strip into cylindrical shape and when necessary fastening the overlapping ends together, will entirely cover such threaded portions. One or more internal projections 2, adapted to engage the threads of the pipe, are formed by forcing in a portion of the metal of the sleeve by means of a suitably-shaped punch, which may be constructed to partially sever the forced-in portions, as shown. When two or more projections are employed, they are formed on a spiral line having a pitch corresponding to that of the threads to be protected. The metal at the outer ends of the sleeve is bent to form an inwardly-projecting flange 3, adapted to bear against the end of the pipe, thereby preventing the sleeve from being screwed too far upon the pipe and also protecting the thread at the extreme end of the pipe.

I claim herein as my invention—

A pipe-thread protector consisting of a metal sleeve having a portion of the metal thereof partially severed from the sleeve and bent inwardly, thereby forming an internal projection adapted to engage the threads of the pipe, substantially as set forth.

In testimony whereof I have hereunto set my hand.

WILLIAM H. PICKETT.

Witnesses:
 THOS. WHITE,
 E. H. TRUSHEL.